United States Patent [19]

Smith

[11] 3,823,433

[45] July 16, 1974

[54] SPREADER FOR SHOE STRETCHER
[75] Inventor: Robert C. Smith, Camden, N.Y.
[73] Assignee: Rochester Shoe Tree Company, Inc., Rochester, N.Y.
[22] Filed: Apr. 26, 1973
[21] Appl. No.: 354,476

[52] U.S. Cl. .............................................. 12/117.2
[51] Int. Cl. ............................................... A43d 5/00
[58] Field of Search ............ 12/117.2, 114.2, 115.6, 12/116.4, 116.8

[56] References Cited
UNITED STATES PATENTS
2,023,618  12/1935  Schecter ........................... 12/117.2
2,145,494  1/1939   Panos ................................ 12/117.2
2,549,502  4/1951   McClenathan ..................... 12/117.2

Primary Examiner—Patrick D. Lawson
Attorney, Agent, or Firm—Cumpston, Shaw & Stephens

[57] ABSTRACT

The inventive spreader applies to a shoe stretcher having a pair of forms that are spreadaable by turning a shaft extending between the forms. The spreader includes an anchorage locked between the forms, a boss on the shaft on each side of the anchorage, a cam threaded on the shaft to move axially of the shaft, and cam follower slots in the forms to hold the cam from rotating and tapered relative to the cam to spread the forms as the cam moves axially of the shaft.

4 Claims, 2 Drawing Figures

PATENTED JUL 16 1974  3,823,433

SPREADER FOR SHOE STRETCHER

THE INVENTIVE IMPROVEMENT

Previous spreader mechanisms for shoe stretchers have used an anchorage having cross pins locked in bores in each form and threaded so that the shaft advances in through the anchorage as it turns to drive a spreader wedge forward in slots in the forms for spreading the forms apart. The spreader wedge tended to wear and break off from the end of the shaft, and the threads on the shaft tended to strip in the anchorage. Furthermore, such a construction was fairly expensive.

The invention involves recognition of the disadvantages of prior art spreaders for shoe stretchers, and proposes a simpler construction less expensive to make, and operating more reliably and without wear problems to achieve a greater spreading angle. The invention aims at simplicity, economy, and easy operation in a rugged and long-lasting shoe stretcher having a wider spread angle capacity.

SUMMARY OF THE INVENTION

The inventive spreader applies to a shoe stretcher having a pair of forms that are spreadable by turning a shaft extending between the forms. The spreader includes an anchorage locked between the forms against movement axially of the shaft, and a boss on the shaft on each side of the anchorage so the shaft can turn freely in the anchorage but cannot move axially of the anchorage. A cam is threaded on the shaft to move axially of the shaft as the shaft turns, and the forms have cam follower slots shaped to hold the cam from rotating and tapered relative to the cam to spread the forms as the cam moves axially of the shaft.

DRAWINGS

FIG. 1 is a partially cut-away, plan view of a preferred embodiment of a shoe stretcher having the inventive spreader; and FIG. 2 is an elevational view of the inventive spreader as seated in one of the forms of a shoe stretcher.

DETAILED DESCRIPTION

Figure 1:
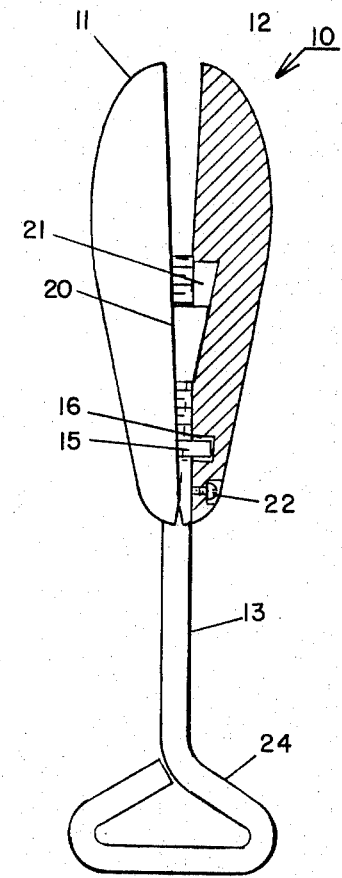
Figure 2:
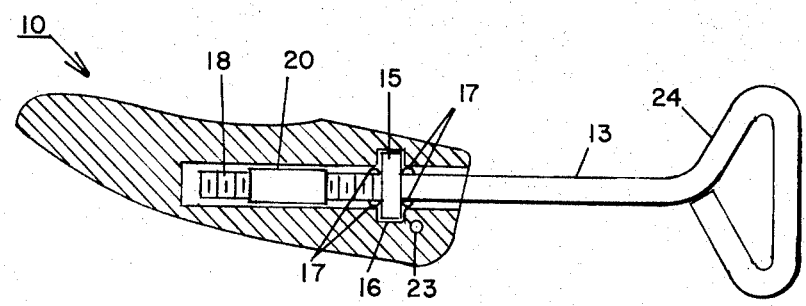

Shoe stretcher 10 has a pair of forms 11 and 12 shaped to fit into a shoe and spread apart in the forefoot region as a shaft 13 turns. Considerable force is required in spreading forms 11 and 12, and they preferably have a fairly wide angle of spread for stretching shoes of various widths. The inventive spreader mechanism is contained between forms 11 and 12 for spreading them apart as described below.

An anchorage in the form of a washer 15 is lodged in a semi-circular slot 16 formed respectively in forms 11 and 12 to lock anchorage 15 against any motion axially of shaft 13. Bosses 17 are formed on shaft 13 closely adjacent opposite sides of washer 15, and bosses 17 are preferably formed of pairs of swaged ears as illustrated. This allows shaft 13 to turn freely within anchorage washer 15, but prevents any axial motion of shaft 13 relative to washer 15.

The forward end of shaft 13 has a screw thread 18, and a cam 20 is threaded on shaft 13. Cam 20 is generally trapezoidal as illustrated, and preferably oriented to broaden with distance from anchorage 15. Cam 20 is housed within slots 21 formed respectively in forms 11 and 12 and tapered to converge toward anchorage 15 at an angle corresponding with the taper of cam 20. Slots 21 prevent cam 20 from rotating so that when shaft 13 is turned, cam 20 moves axially of shaft 13 along the length of slots 21. As cam 20 moves toward anchorage 15 it spreads forms 11 and 12 apart as shown in FIG. 1. Cam 20 and the taper of slots 21 could also be reversed to spread forms 11 and 12 apart as cam 20 moves away from anchorage, but this would not be quite as desirable.

A bolt 22 extends through a hole 23 in the rear or heel region of forms 11 and 12 rearward of anchorage 15 for holding the rear region of forms 11 and 12 loosely together. Bolt 22 is loose enough in hole 23 to allow the spreading motion of the forward region of forms 11 and 12, and bolt 22 retains forms 11 and 12 together with the inventive spreader mechanism trapped between them.

In operation, shaft 13 is turned counterclockwise to draw forms 11 and 12 together for insertion into a shoe with shaft 13 extending out over the upper rear of the shoe. Then shaft 13 is turned clockwise to draw cam 20 toward anchorage 15 and force slots 21 apart to spread forms 11 and 12 for stretching the shoe. Threads 18 have a considerable purchase in cam 20 so that they do not tend to strip, and the rest of the strain is between bosses 17, anchorage washer 15, and slots 16. Washer 15 is large, tough and simple, and is securely housed in slots 16, and swaged ear bosses 17 afford a secure and wear-free connection between shaft 13 and anchorage 15. Also, cam 20 approaches closer to the pivotal fulcrum point as forms 11 and 12 spread further apart so that greater increments of spread angle occur with increments of travel of cam 20 toward anchorage 15. This provides a relatively wide spread angle between forms 11 and 12 while maintaining a positive and reliable action. Since shaft 13 remains axially fixed during operation, handle 24 stays comfortably clear of the heel of the shoe.

The inventive spreader is simpler, more inexpensive to produce, more rugged and reliable, less subject to wear or breakage, more convenient to operate, and better looking. Hence, it is cheaper and performs better than prior art spreaders.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the various materials and constructions possible in applying the inventive spreader to different shoe stretchers.

I claim:

1. In a shoe stretcher having a pair of forms that are spreadable by turning a shaft extending between said forms, an improved spreader comprising:
   a. a bolt extending through a rear region of said forms for holding said rear region of said forms loosely together;
   b. rear regions of the confronting faces of said forms having a pair of opposed, transverse slots;
   c. an anchorage formed as a washer recessed in said slots in said forms;
   d. ears swaged out from said shaft to form a base on each side of said anchorage washer so said shaft can turn freely in said anchorage washer, but cannot move axially of said anchorage washer;
e. a cam threaded on said shaft to move axially of said shaft as said shaft turns; and
f. said forms having cam follower slots holding said cam from rotation and tapered relative to said cam to spread said forms as said cam moves axially of said shaft.

2. The spreader of claim 1 wherein said cam is generally trapezoidal and oriented to broaden with distance from said anchorage.

3. The spreader of claim 1 wherein said cam follower slots converge toward said anchorage to spread said forms as said cam moves toward said anchorage.

4. The spreader of claim 3 wherein said cam is generally trapezoidal and oriented to broaden with distance from said anchorage.

* * * * *